(12) United States Patent
Shimasaki

(10) Patent No.: US 11,434,998 B2
(45) Date of Patent: Sep. 6, 2022

(54) COMPRESSOR

(71) Applicant: TOYOTA JIDOSHA KABUSHIKI KAISHA, Toyota (JP)

(72) Inventor: Shinobu Shimasaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/559,796

(22) Filed: Sep. 4, 2019

(65) Prior Publication Data
US 2020/0080641 A1    Mar. 12, 2020

(30) Foreign Application Priority Data

Sep. 10, 2018 (JP) .............................. JP2018-168886

(51) Int. Cl.
*F16J 15/16* (2006.01)
*F04B 17/03* (2006.01)

(52) U.S. Cl.
CPC ............. *F16J 15/162* (2013.01); *F04B 17/03* (2013.01)

(58) Field of Classification Search
CPC .... F16J 15/00; F16J 15/16; F16J 15/50; F16J 15/52; F16J 15/162; F16J 15/324; F16J 15/3404; F16J 15/40; F04B 17/00; F04B 17/03
USPC ......................................................... 277/408
See application file for complete search history.

(56) References Cited

U.S. PATENT DOCUMENTS

| 6,449,950 | B1 * | 9/2002 | Allen | .................... F04D 25/024 |
| | | | | 417/407 |
| 8,001,781 | B2 * | 8/2011 | Shibui | ..................... F02B 37/10 |
| | | | | 417/407 |
| 2017/0102003 | A1 * | 4/2017 | Sishtla | .................. F04D 29/053 |

FOREIGN PATENT DOCUMENTS

| DE | 102015216192 A1 | 3/2017 |
| JP | S5399467 U | 8/1978 |
| JP | 2005315392 A | 11/2005 |
| JP | 2017127139 A | 7/2017 |
| JP | 2017133426 A | 8/2017 |

* cited by examiner

*Primary Examiner* — Nathan Cumar
(74) *Attorney, Agent, or Firm* — Dickinson Wright, PLLC

(57) ABSTRACT

A compressor includes an impeller configured so as to compress gas, an electric motor, a rotary shaft configured so as to join the impeller and the electric motor to each other, a housing configured so as to house the rotary shaft and the electric motor, a mechanical seal that includes a rotation-side seal member provided in the rotary shaft, and a stationary-side seal member fixed to the housing so as to be in contact with the rotation-side seal member on a side of the impeller, and a member that defines a lubricant reservoir provided under the mechanical seal in a gravity direction and disposed so as to store lubricant, the member being disposed so that the lubricant reservoir is arranged such that at least a part of the rotation-side seal member on an outer circumference side passes through when rotation-side seal member rotating due to rotation of the rotary shaft.

5 Claims, 4 Drawing Sheets

COMPRESSOR

INCORPORATION BY REFERENCE

The disclosure of Japanese Patent Application No. 2018-168886 filed on Sep. 10, 2018 including the specification, drawings and abstract is incorporated herein by reference in its entirety.

BACKGROUND

1. Technical Field

The disclosure relates to a compressor.

2. Description of Related Art

Japanese Unexamined Patent Application Publication No. 2005-315392 (JP 2005-315392 A) discloses a compressor such as gas turbine that rotates at a high speed. In such a compressor, mist-like lubricating oil is supplied to a contact surface of a mechanical seal.

SUMMARY

However, when the compressor is rotated at a high speed, lubricant scatters due to centrifugal force, and the lubricant runs short of supply, and members in the mechanical seal come into contact with each other. This may cause wear of the members of the mechanical seal part.

The disclosure is carried out in the aspects described below.

(1) According to an aspect of the disclosure, a compressor is provided. The compressor includes an impeller that compresses gas, an electric motor, a rotary shaft that joins the impeller and the electric motor to each other, a housing that houses the rotary shaft and the electric motor, a mechanical seal, and a member that defines a lubricant reservoir that is provided blow the mechanical seal in a gravity direction and disposed so as to store lubricant. The mechanical seal includes a rotation-side seal member provided in the rotary shaft, and a stationary-side seal member fixed to the housing so that the stationary-side seal member comes into contact with the rotation-side seal member on a side of the impeller. The member that defines the lubricant reservoir is disposed so that at least a part of the rotation-side seal member on an outer circumference side passes through the lubricant reservoir. The rotation-side seal member rotates due to rotation of the rotary shaft. According to this aspect, since the member that defines the lubricant reservoir is provided, it is possible to supply sufficient lubricant from the lubricant reservoir to the mechanical seal. As a result, it is possible to restrain wear of the rotation-side seal member and the stationary-side seal member that configure the mechanical seal.

(2) In the forgoing aspect, a wall portion may be provided in the housing so that the wall portion and the stationary-side seal member sandwich the rotation-side seal member. The wall portion may extend to a position on a side of the center of the rotary shaft with respect to a lubrication radius of the mechanical seal. The lubricant reservoir may be surrounded by the housing, the stationary-side seal member, the rotation-side seal member, and the wall portion. According to the aspect, it is possible to form the lubricant reservoir easily.

(3) In the foregoing aspect, the compressor may include a bearing provided between the rotary shaft and the housing and on an opposite side of the wall portion from the stationary-side seal member, and a drain may be provided between the wall portion and the bearing. According to the aspect, excessive lubricant is discharged from the drain. As a result, excessive supply of lubricant to the bearing is restrained, and it is thus possible to restrain an increase in sliding torque of the bearing. Also, similarly to the foregoing aspect, it is possible to restrain wear of a contact surface of the mechanical seal.

(4) In the foregoing aspect, the bearing that supports the rotary shaft may be fixed to the housing by a bearing holder, and, a first spacer, the rotation-side seal member, and a second spacer may be provided between the bearing and the impeller in this order from the bearing. The rotation-side seal member may be in contact with the stationary-side seal member fixed to the housing. Also, the drain may be made of a hole that is formed in a lower part of the bearing holder in the gravity direction. The hole starts from a space between the first spacer and the bearing holder, passes through the bearing holder, and communicates with an oil reservoir.

(5) In the foregoing aspect, the lubrication radius of the mechanical seal may be a distance between a center of rotation of the rotary shaft and a circular line connecting centers of a contact position between the rotation-side seal member and the stationary-side seal member.

The disclosure may be carried out in various aspects other than a compressor. For example, the disclosure can be carried out in an aspect such as mechanical seal and so on in a compressor.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

Figure 1:
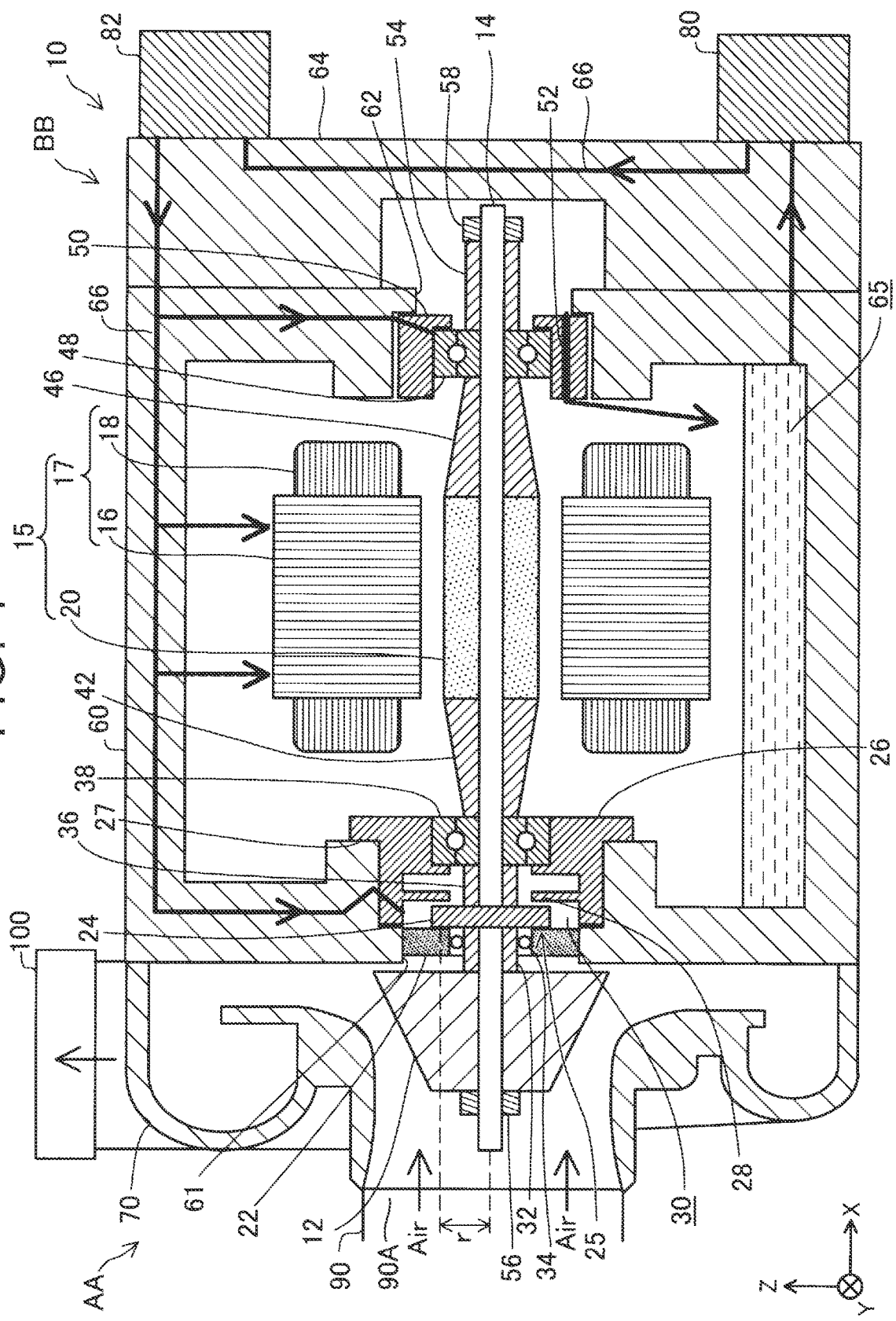
FIG. 1 is a view describing a rough structure of a compressor according to a first embodiment.

FIG. 1 is a view describing a rough structure of a compressor 10 according to a first embodiment. The compressor 10 is a so-called centrifugal electric compressor. In the embodiment, the compressor 10 is provided in a gas supply flow passage 90 that supplies gas to a fuel cell stack 100. The compressor 10 compresses gas and supplies the compressed gas to the fuel cell stack 100. In the embodiment, air is used as the gas, but oxygen or other gas may be used.

The compressor 10 includes a compression section AA in which an impeller 12 is housed, and a motor section BB in which an electric motor 15 that rotates the impeller 12 is housed. The compression section AA includes the impeller 12 and an impeller storage part 70 that houses the impeller 12. A gas intake port 90A that sucks in air is provided approximately at a center of the impeller storage part 70 on a side opposite from a side that is joined to the motor section BB. A gas delivery passage which delivers compressed air to the fuel cell stack 100 is formed in a part of a side surface of the impeller storage part 70.

The motor section BB that is connected to the compression section AA has a housing 60 that houses the electric motor 15 having a rotary shaft 14. Also, bearings 38, 48 are provided on both sides of the electric motor 15 in the housing 60 in an axis direction of the electric motor 15, respectively. The rotary shaft 14 is supported by both of the bearings 38, 48 so that the rotary shaft 14 is able to rotate. The rotary shaft 14 extends on an outer side of the bearing 38, and a distal end of the rotary shaft 14 is connected with the impeller 12 inside the impeller storage part 70. The rotary shaft 14 connects the electric motor 15 and the impeller 12 to each other.

The bearing 38 that supports the rotary shaft 14 is fixed to the housing 60 with a bearing holder 26. Between the bearing 38 and the impeller 12, a spacer 36, a rotation-side seal member 24, and a spacer 32 are provided in this order from the bearing 38, and the rotation-side seal member 24 is in contact with a stationary-side seal member 22 that is fixed to the housing 60. The rotation-side seal member 24 and the stationary-side seal member 22 are made from metal and configure a so-called mechanical seal 25.

Between the bearing 38 and the bearing 48 that support the rotary shaft 14, a rotor magnet 20 and spacers 42, 46 are provided. The spacers 42, 46 fix the rotor magnet 20 between both of the bearings 38, 48. Further, a spacer 54 is provided on an outer side of the bearing 48. Both ends of the rotary shaft 14 protrude from the spacer 54 and the impeller 12, respectively, and Male screws are formed in the protruding portions. As a nut 56 and a nut 58 are screwed to the Male screw portions from both sides, respectively, the impeller 12, the mechanical seal 25, the rotor magnet 20, and so on are positioned and fixed to the rotary shaft 14.

The electric motor 15 housed in the housing 60 is provided with a stator 17 at a position surrounding the rotor magnet 20. The stator 17 includes a stator iron core 16 and a stator coil 18. Although the stator 17 is fixed so as to be coaxial with the rotary shaft 14 and the rotor magnet 20, fixation of the stator 17 is not shown. In the rotor magnet 20, an S-pole and an N-pole are arranged alternately around an axis of the rotary shaft 14 corresponding to the number of phases of the electric motor 15.

Hereinafter, a configuration of the mechanical seal 25 is described in detail. The rotation-side seal member 24 is disposed on the rotary shaft 14 through a spacer 32 on a housing 60 side of the impeller 12. The rotation-side seal member 24 has a disk shape such that the rotary shaft 14 passes through a center of the rotation-side seal member 24, and the rotation-side seal member 24 rotates together with the rotary shaft 14. The stationary-side seal member 22 is provided between the impeller 12 and the rotation-side seal member 24 in the housing 60. The stationary-side seal member 22 has a disk shape with a hole at a center through which the rotary shaft 14 passes without touching the stationary-side seal member 22. The stationary-side seal member 22 is fixed to the housing 60, and does not rotate with rotation of the rotary shaft 14. The mechanical seal 25 is formed in a portion where the stationary-side seal member 22 and the rotation-side seal member 24 come into contact. A distance r between a center of rotation of the rotary shaft 14, and a circular line connecting approximate centers of a contact position between the rotation-side seal member 24 and the stationary-side seal member 22 is referred to as a "mechanical seal lubrication radius". Between the stationary-side seal member 22 and the spacer 32, an O-ring 34 is disposed in order to restrain gas compressed by the impeller from entering the housing 60.

The bearing 38 is sandwiched between the rotary shaft 14 and the bearing holder 26. The bearing holder 26 is fixed to the housing 60. The bearing holder 26 includes an engagement portion 27 and a wall portion 28. The engagement portion 27 determines a position of the bearing holder 26. The wall portion 28 is provided at a position so that the wall portion 28 and the stationary-side seal member 22 sandwich the rotation-side seal member 24. The wall portion 28 has a shape so that the wall portion 28 extends from a position on an outer side and separated from a center of the rotary shaft 14 by at least the mechanical seal lubrication radius r, to a position on a side of the center of the rotary shaft 14 with respect to the mechanical seal lubrication radius r. Thus, the wall portion 28 has a shape protruding to the inner side like a flange. The wall portion 28 does not need to be in contact with the rotation-side seal member 24. In the embodiment, a space 30 surrounded by the stationary-side seal member 22, the rotation-side seal member 24, the wall portion 28, and the bearing holder 26 is formed. The space 30 is also referred to as a "lubricant reservoir 30" because lubricant supplied is accumulated in the space 30. The lubricant in the lubricant reservoir 30 is supplied to the mechanical seal 25 between the stationary-side seal member 22 and the rotation-side seal member 24. In FIG. 1, hatching that represents oil in the lubricant reservoir 30 is not shown for convenience of the drawings. In the embodiment, the wall portion 28 is formed in the bearing holder 26. However, the wall portion 28 and the bearing holder 26 may be separate members from each other. In this case, the lubricant reservoir 30 is formed in a space surrounded by the stationary-side seal member 22, the rotation-side seal member 24, the wall portion 28, and the housing 60.

The bearing 48 is held by the housing 60 through the bearing holder 50. An oil flow passage 52 in which the lubricant supplied to the bearing 48 flows is formed in a lower portion of the bearing holder 50.

The nut 58 is provided on the rotary shaft 14 through the spacer 54 on a side of an entrance of the housing 60 with respect to the bearing 48. The rotary shaft 14, the spacer 54, and the nut 58 protrude from an opening 62 of the housing 60 on the side of the entrance. The nuts 56, 58 determine positions of the impeller 12, the bearings 38, 48, the spacers 32, 36, 42, 46, 54, the rotation-side seal member 24, and the rotor magnet 20.

A lid 64 is provided in the housing 60 so that the lid 64 covers the opening 62. An oil pump 80 and an oil cooler 82 are disposed in the lid 64. The oil pump 80 supplies the lubricant to the electric motor 15 and the mechanical seal 25. The oil pump 80 circulates the lubricant inside the housing 60. The oil cooler 82 cools the lubricant. The lubricant is stored in an oil reservoir 65 in a lower portion of the housing 60. The lubricant circulated inside the housing 60 by the oil pump 80 is sucked up by the oil pump 80 from the oil reservoir 65 and sent to the oil cooler 82. After the oil cooler 82 cools the lubricant, the lubricant is supplied to the lubricant reservoir 30 and the bearing 48 through an oil flow passage 66. Thereafter, the lubricant falls into the oil reservoir 65.

Figure 2:
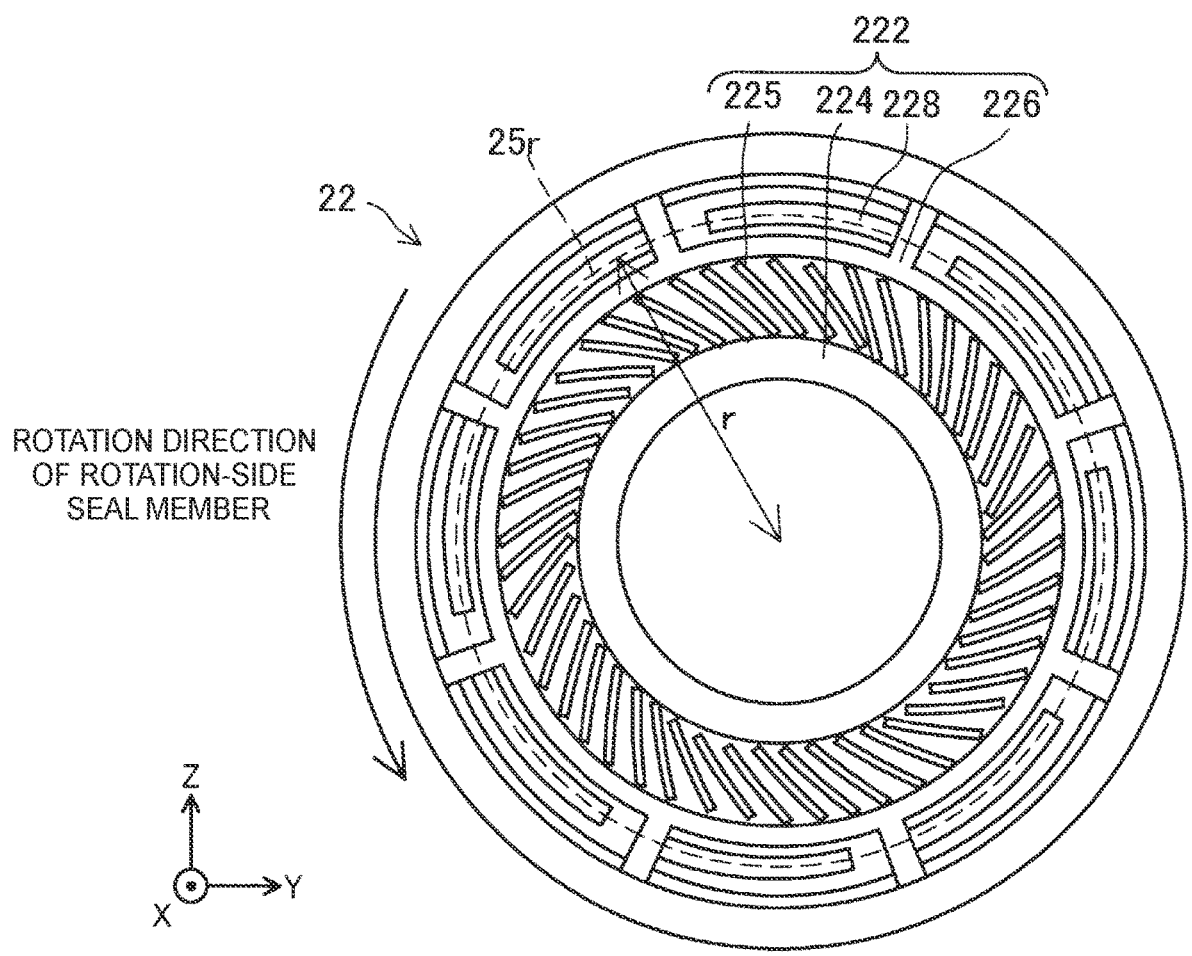
FIG. 2 is a view describing a shape of a stationary-side seal member on a side of a rotation-side seal member.
Figure 3:
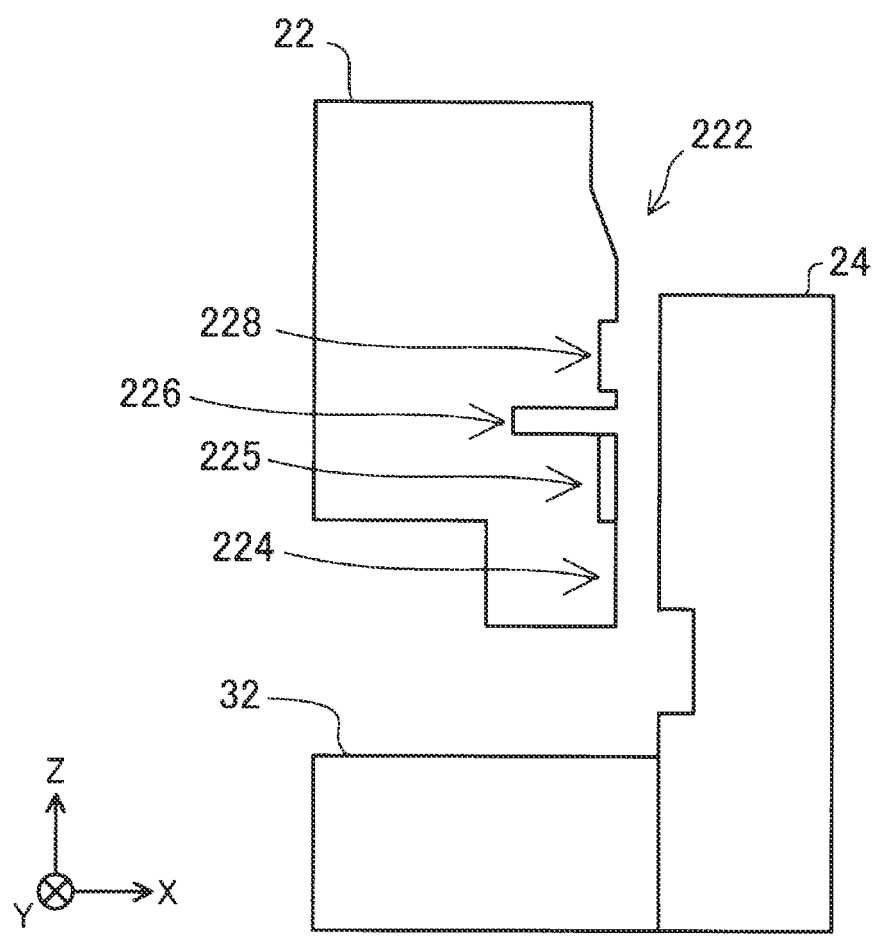
FIG. 3 is a sectional view of the stationary-side seal member.

FIG. 2 is a view describing a sliding surface 222 of the stationary-side seal member 22, the sliding surface 222 sliding with the rotation-side seal member 24. FIG. 3 is a sectional view of the stationary-side seal member 22. The stationary-side seal member 22 has a disk shape. In the sliding surface 222 of the stationary-side seal member 22 on a side of the rotation-side seal member 24, a land portion 224, spiral grooves 225, a deep groove 226, and Rayleigh-step grooves 228 are formed in this order from an inner side.

The land portion 224 comes into contact with the rotation-side seal member 24 while rotation of the rotation-side seal member 24 is stopped, so that leakage of the lubricant to the inner side is restrained. Each of the spiral grooves 225 is formed on an outer side of the land portion 224, and has a shape so that each of the spiral grooves 225 on an outer circumference side with respect to the center side is inclined so as to proceed towards a rotation direction of the rotation-side seal member 24. Therefore, when the rotation-side seal member 24 rotates, the lubricant is pulled towards the outer circumference along the spiral grooves 225. As a result, leakage of the lubricant to the inner side is restrained. The Rayleigh-step grooves 228 are a plurality of recessed portions formed on outer edge sides of the spiral grooves 225. The Rayleigh-step grooves 228 are connected with the deep groove 226 on a rear side in the rotation direction of the rotation-side seal member 24. The Rayleigh-step grooves 228 form an oil film on the sliding surface 222, and reduce friction between the stationary-side seal member 22 and the rotation-side seal member 24. The deep groove 226 is formed between the spiral grooves 225 and the Rayleigh-step grooves 228, and also between the neighboring Rayleigh-step grooves 228. The deep groove 226 is deeper than the Rayleigh-step grooves 228 and the spiral grooves 225. The deep groove 226 restrains a flow of the lubricant in the Rayleigh-step grooves 228 from affecting the Rayleigh-step grooves 228.

As described so far, according to the first embodiment, the compressor 10 includes the lubricant reservoir 30 that stores the lubricant and is provided below the mechanical seal 25 in the gravity direction, and at least a part of the rotation-side seal member 24 that rotates due to rotation of the rotary shaft 14 on the outer circumference side passes through the lubricant reservoir 30. As a result, the lubricant is supplied sufficiently from the lubricant reservoir 30 to a contact surface 242 of the rotation-side seal member 24, and it is thus possible to restrain wear of the stationary-side seal member 22 and the rotation-side seal member 24 that are members configuring the mechanical seal 25.

Further, according to the first embodiment, the compressor 10 has the wall portion 28 that extends from the outer side of a position of the mechanical seal lubrication radius r to the position on the side of the center of the rotary shaft 14 with respect to the mechanical seal lubrication radius r. Therefore, the lubricant reservoir 30 is formed easily in a space surrounded by the stationary-side seal member 22, the rotation-side seal member 24, the wall portion 28, and the housing 60. The lubricant reservoir 30 may be configured without using the wall portion 28. For example, the rotation-side seal member 24 may be sandwiched by two of the stationary-side seal members 22.

B. Second Embodiment

Figure 4:
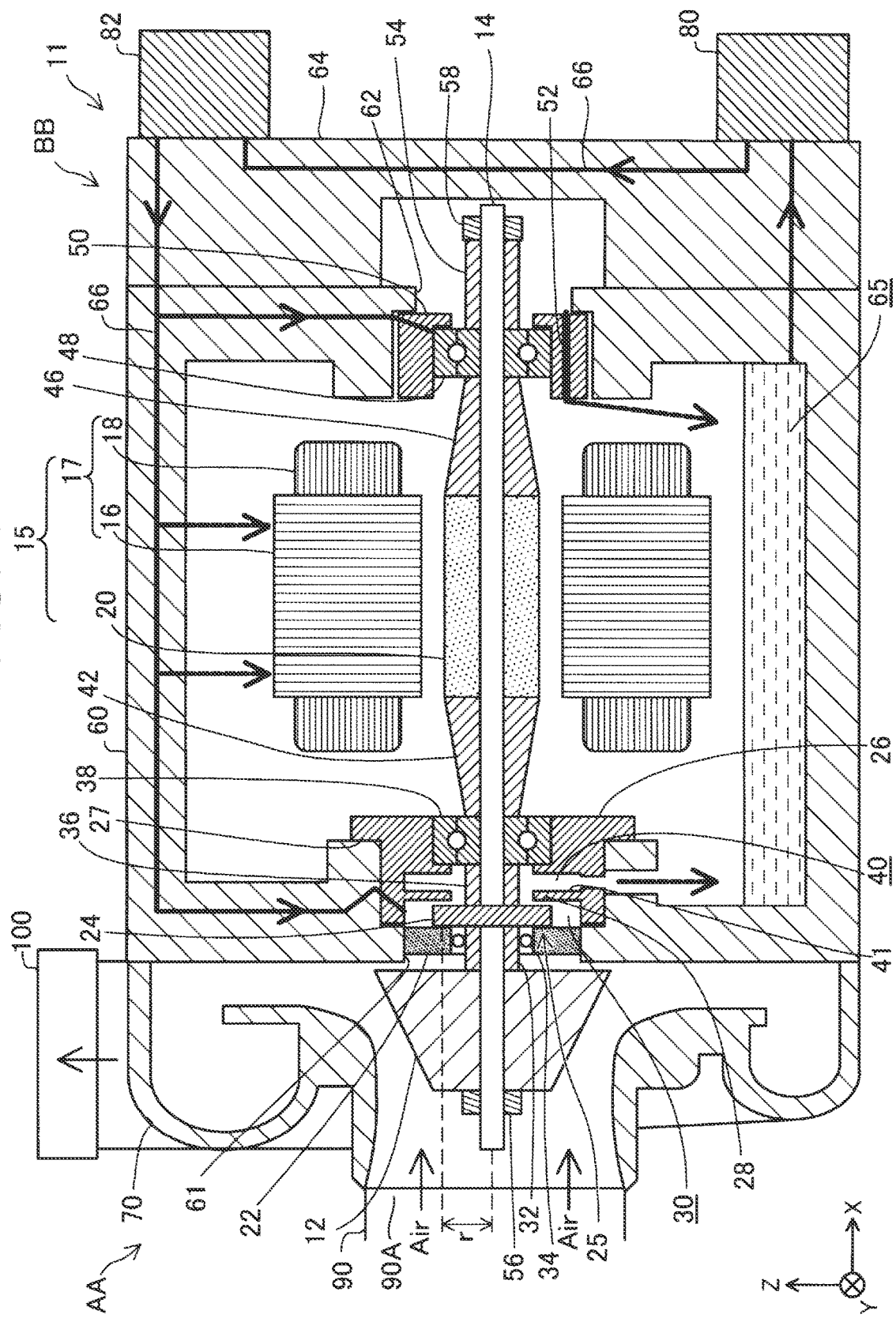
FIG. 4 is a view describing a rough structure of a compressor according to a second embodiment.

FIG. 4 is a view describing a rough structure of a compressor 11 according to a second embodiment. The compressor 11 is different from the compressor 10 according to the first embodiment shown in FIG. 1 in that a drain 40 is provided between a wall portion 28 and a bearing 38, and the rest of the configuration is the same. In the second embodiment, the drain 40 is made of a hole 41 that is formed in a lower part of a bearing holder 26 in the gravity direction. The hole 41 starts from a space between a spacer 36 and the bearing holder 26, passes through the bearing holder 26, and communicates with an oil reservoir 65. It is possible to form the drain 40 in another route as long as the drain 40 is able to make lubricant move from the space between the spacer 36 and the bearing holder 26 to the oil reservoir 65.

According to the second embodiment, when excessive lubricant is supplied to the lubricant reservoir 30, the excessive lubricant is collected in the oil reservoir 65 through the drain 40. Therefore, it is possible to restrain an increase in sliding torque of the bearing 38 caused by excessive supply of the lubricant to the bearing 38.

In the second embodiment, the drain 40 is provided near the bearing 38. However, a drain may also be provided near the bearing 48.

In the first and second embodiments, the stationary-side seal member 22 is provided with the spiral grooves 225. The spiral grooves 225 on the outer side are inclined towards the front in the rotation direction of the rotation-side seal member 24. However, the rotation-side seal member 24 may have a configuration provided with a spiral groove that is inclined to the rear in the rotation direction of the rotation-side seal member 24. Once the rotation-side seal member 24 rotates, the lubricant moves to an outer circumference along the spiral grooves, and leakage of the lubricant to the inner side is restrained.

In the foregoing embodiments, a turbo-type compressor that rotates the impeller 12 is described as an example. However, the compressor may be of a different type such as a roots-type. Further, the impeller 12 is driven by the electric motor 15, but may also be driven by exhaust gas.

The disclosure is not limited to the foregoing embodiments, and may be carried out in various configurations without departing from the gist of the disclosure. For example, technical characteristics of the embodiments corresponding to technical characteristics in each of the aspects described in Summary of the Disclosure may be replaced and combined as appropriate. Also, unless the technical characteristics are described as essential in the specification, such technical characteristics may be deleted as appropriate.

What is claimed is:

1. A compressor comprising:
   an impeller configured to compress gas;
   an electric motor;
   a rotary shaft configured to join the impeller and the electric motor to each other;
   a housing configured to house the rotary shaft and the electric motor;
   a mechanical seal that includes a rotation-side seal member provided in the rotary shaft, and a stationary-side seal member fixed to the housing so that the stationary-side seal member comes into contact with the rotation-side seal member on a side of the impeller; and
   a wall portion that defines a lubricant reservoir that is provided under the mechanical seal in a gravity direction and disposed to store lubricant, the wall portion being disposed so that the lubricant reservoir is arranged such that at least a part of the rotation-side seal member on an outer circumference side passes through when the rotation-side seal member rotates due to rotation of the rotary shaft;
   wherein the wall portion is provided in the housing so that the wall portion and the stationary-side seal member sandwich the rotation-side seal member, and
   the lubricant reservoir is surrounded by the housing, the stationary-side seal member, the rotation-side seal member, and the wall portion.

2. The compressor according to claim 1, wherein the wall portion extends to a position on a side of a center of the rotary shaft with respect to a lubrication radius of the mechanical seal.

3. The compressor according to claim 2, further comprising a bearing provided between the rotary shaft and the housing and on an opposite side of the wall portion from the stationary-side seal member, wherein a drain is provided between the wall portion and the bearing.

4. The compressor according to claim 3, wherein:
- the bearing that supports the rotary shaft is fixed to the housing by a bearing holder;
- a first spacer, the rotation-side seal member, and a second spacer are provided between the bearing and the impeller in this order from the bearing, and the rotation-side seal member is in contact with the stationary-side seal member fixed to the housing; and
- the drain is made of a hole that is formed in a lower part of the bearing holder in the gravity direction, the hole starting from a space between the first spacer and the bearing holder, passing through the bearing holder, and communicating with an oil reservoir.

5. The compressor according to claim 2, wherein the lubrication radius of the mechanical seal is a distance between a center of rotation of the rotary shaft and a circular line connecting centers of a contact position between the rotation-side seal member and the stationary-side seal member.

\* \* \* \* \*